United States Patent
Kalele et al.

(10) Patent No.: US 9,953,394 B2
(45) Date of Patent: Apr. 24, 2018

(54) METHODS AND SYSTEMS FOR DESIGNING CORRELATION FILTER

(71) Applicant: Tata Consultancy Services Limited, Mumbai (IN)

(72) Inventors: Amit Kalele, Pune (IN); Anubhav Jain, Pune (IN); Srinivasa Rao Chalamala, Hyderabad (IN); Manoj Karunakaran Nambiar, Mumbai (IN)

(73) Assignee: Tata Consultancy Services Limited, Mumbai (IN)

(*) Notice: Subject to any disclaimer, the term of this patent is extended or adjusted under 35 U.S.C. 154(b) by 155 days.

(21) Appl. No.: 15/055,338

(22) Filed: Feb. 26, 2016

(65) Prior Publication Data

US 2016/0253775 A1     Sep. 1, 2016

(30) Foreign Application Priority Data

Feb. 26, 2015 (IN) .......................... 641/MUM/2015

(51) Int. Cl.
*G06K 9/40*     (2006.01)
*G06T 1/20*     (2006.01)
*G06T 1/60*     (2006.01)
*G06F 13/42*    (2006.01)

(52) U.S. Cl.
CPC ............ *G06T 1/20* (2013.01); *G06F 13/4282* (2013.01); *G06T 1/60* (2013.01)

(58) Field of Classification Search
CPC .. G06F 17/15; G06K 9/40; G06T 1/20; G06T 1/60
USPC ................ 382/181, 260–263, 278
See application file for complete search history.

(56) References Cited

U.S. PATENT DOCUMENTS

| | | | |
|---|---|---|---|
| 7,483,569 B2 * | 1/2009 | Bhagavatula | G06K 9/746 382/181 |
| 7,933,449 B2 | 4/2011 | Natori | |
| 7,966,277 B2 | 6/2011 | Adams | |
| 8,369,460 B1 | 2/2013 | Su | |
| 2010/0322534 A1 * | 12/2010 | Bolme | G06K 9/746 382/278 |

* cited by examiner

*Primary Examiner* — Daniel Mariam
(74) *Attorney, Agent, or Firm* — Finnegan, Henderson, Farabow, Garrett & Dunner LLP (57) ABSTRACT

This disclosure relates generally to correlation filters, and more particularly to designing of correlation filter. In one embodiment, a system for designing a correlation filter in a multi-processor system includes a multi-core processor coupled to a first memory and one or more co-processors coupled to one or more respective second memories. The multi-core processor partitions each of a plurality of frames associated with media content into a plurality of pixel-columns, and systematically stores said pixel-columns width-wise in a plurality of temporary matrices by a plurality of threads of the multi-core processor. The plurality of temporary matrices are transferred by the multi-core processor to one or more respective second memories in a plurality of streams simultaneously in an asynchronous mode. A plurality of filter harmonics of the correlation filter are computed by performing compute operations involving at least the plurality of temporary matrices, to obtain the correlation filter.

20 Claims, 7 Drawing Sheets

METHODS AND SYSTEMS FOR DESIGNING CORRELATION FILTER

PRIORITY CLAIM

This U.S. patent application claims priority under 35 U.S.C. §119 to: India Application No. 641/MUM/2015, filed on Feb. 26, 2015. The entire contents of the aforementioned application are incorporated herein by reference.

TECHNICAL FIELD

This disclosure relates generally to correlation filters, and more particularly to methods and systems for designing correlation filter.

BACKGROUND

Correlation filters are a set of synthesized spatial filters that produce controlled response with sharp peaks. Correlation filter are optimized to enhance the recognition of consistent parts while suppressing varying patterns. While providing excellent discrimination capabilities, the correlation filters also offer shift, rotation and scale invariance for 2D images.

Synthesizing the correlation filter for pattern recognition applications involve several complex mathematical operations and require high computation resources, especially for high resolution images and videos. For example, synthesis of an Optimal Trade-Off Circular Harmonic Function Filter (OTCHF) is highly compute intensive and time consuming process. Hence designing of correlation filters has limitations in pattern recognition applications which require real-time processing.

SUMMARY

Embodiments of the present disclosure present technological improvements as solutions to one or more of the above-mentioned technical problems recognized by the inventors in conventional systems. For example, in one embodiment, a method for designing a correlation filter in a multi-processor system is provided. In an embodiment, the multi-processor system includes a multi-core processor coupled to a first memory and one or more co-processors coupled to one or more respective second memories. In an embodiment, the method for designing the correlation filter includes receiving, by the multi-core processor, a media content comprising a plurality of frames. Further, the method includes partitioning, by the multi-core processor, each frame of the plurality of frames into a plurality of pixel-columns having equal width. Furthermore, the method includes systematically storing the plurality of pixel-columns width-wise into a plurality of temporary matrices. Storing the plurality of pixel-columns into the plurality of temporary matrices is performed in parallel by a plurality of threads of the multi-core processor. Also, the method includes transferring, by the multi-core processor, the plurality of temporary matrices to one or more respective second memories in a plurality of streams simultaneously in an asynchronous mode. Additionally, the method includes computing, by the one or more co-processors, a plurality of filter harmonics of the correlation filter in the plurality of streams. Computing in a stream of the plurality of streams comprises performing compute operations involving at least the plurality of temporary matrices, to obtain the correlation filter.

In another embodiment, a multi-processor system for designing a correlation filter in a multi-processor system is provided. The system includes a first memory, a multi-core processor coupled to the first memory, one or more co-processors coupled to the multi-core processor; and one or more respective second memories associated with the one or more co-processors. The multi-core processor is capable of executing programmed instructions stored in the first memory and the one or more co-processors are capable of executing programmed instructions stored in the one or more respective second memories to receive, by the multi-core processor, a media content comprising a plurality of frames. Further, the instructions are configured to partition, by the multi-core processor, each frame of the plurality of frames into a plurality of pixel-columns having equal width. Furthermore, the instructions are configured to systematically store the plurality of pixel-columns width-wise into a plurality of temporary matrices. Storing the plurality of pixel-columns into the plurality of temporary matrices is performed in parallel by a plurality of threads of the multi-core processor. Also the instructions are configured to transfer, by the multi-core processor, the plurality of temporary matrices to one or more respective second memories in a plurality of streams simultaneously in an asynchronous mode. In addition, the instructions are configured to compute, by the one or more co-processors, a plurality of filter harmonics of the correlation filter in the plurality of streams. Computing in a stream of the plurality of streams includes performing compute operations involving at least the plurality of temporary matrices, to obtain the correlation filter.

In yet another embodiment, a non-transitory computer-readable medium having embodied thereon a computer program for executing a method for designing a correlation filter in a multi-processor system. In an embodiment the multi-processor system includes a multi-core processor coupled to a first memory and one or more co-processors coupled to one or more respective second memories. In an embodiment, the method for designing the correlation filter includes receiving, by the multi-core processor, a media content comprising a plurality of frames. Further, the method includes partitioning, by the multi-core processor, each frame of the plurality of frames into a plurality of pixel-columns having equal width. Furthermore, the method includes systematically storing the plurality of pixel-columns width-wise into a plurality of temporary matrices. Storing the plurality of pixel-columns into the plurality of temporary matrices is performed in parallel by a plurality of threads of the multi-core processor. Also, the method includes transferring, by the multi-core processor, the plurality of temporary matrices to one or more respective second memories in a plurality of streams simultaneously in an asynchronous mode. Additionally, the method includes computing, by the one or more co-processors, a plurality of filter harmonics of the correlation filter in the plurality of streams. Computing in a stream of the plurality of streams comprises performing compute operations involving at least the plurality of temporary matrices, to obtain the correlation filter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and methods for design of correlation filters. Correlation filtering is a process of correlating a digital image or a signal with a filter (a precomputed template) that is optimized to return an expected response. The expected magnitude response in correlation filtering are sharp peak(s) in the correlation output at locations where there is a match between the template and the signal satisfying the constraints of the template design.

Various pattern recognition applications such as face recognition, fingerprint recognition, target detection, iris recognition, digital watermarking, and the like require classification performance to be invariant to small in-plane rotation, shift and scaling. Thus, the Correlation filters, such as Optimal trade-off circular harmonic function filters (OTCHF), are designed to account in-plane rotation distortion. Said correlation filter can be designed with the help of a set of training data containing images or frames, where the training data represents an anticipated set of distortions yielding pre-determined responses to the training images. An optimized correlation filter may yield similar correlation outputs in response to test images that are from the same class as the training images while providing distortion-tolerant correlation outputs. An example of correlation filter design is presented hereunder.

Herein, the correlation filter is designed for media content, such as a video or a set of images. The video content may be considered as including a plurality of frames, and such frames may be considered as images. The steps involved in design of the correlation filter are presented with reference to FIG. 1A-1B.

Figure 1A:
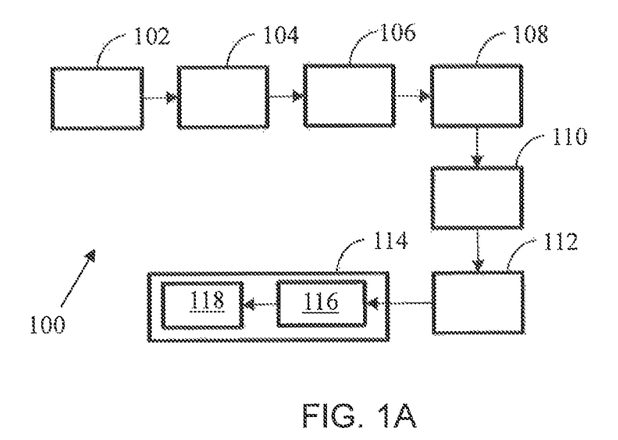
FIGS. 1A and 1B illustrate an exemplary a process flow for design of the correlation filter according to some embodiments of the present disclosure.

FIG. 1A illustrates a process flow 100 for design of the correlation filter in accordance with an example embodiment. At block 102, a two-dimensional Fourier transform of each of the plurality of frames f(x; y) is computed to obtain a Fourier transformed image F(u; v). At block 104, an index matrix which maps the Fourier transformed image F(u; v) to polar coordinates is computed to obtain F(ρ; φ) where $\rho=\sqrt{(u2+v2)}$ and $\varphi=\tan^{-1}(v/u)$.

At block 106 a harmonic function F(ρ) is computed by operating Fourier transom along a ρ axis on F(ρ; φ). At block 108, a desired correlation function matrix is defined by setting '1' at locations where the response should be maximum, and '0' at other location in the matrix where the response must be minimal. At block 110, optimal Circular Harmonic Function (CHF) weights/coefficients ($C_k$) are obtained by computing Fourier transform of the desired correlation function matrix.

At 112, a figure of merit, $P_{FOM}$ is computed based on the value of coefficients ($C_k$). The figure of merit is indicative of a quality of filter. At 114, the filter harmonics $H_k(\rho)$ is computed with inputs matrices $P_{FOM}$, $C_k$, index matrix and plurality of frames, F(ρ) etc.

as $H_k(\rho)=\lambda_k \cdot F_k(\rho)/P_{FOM}(\rho)$ where $\lambda_k=C_b/\int_0^\infty |F_k(\rho)|^2/P_{FOM}(\rho)\rho d\rho$ For the plurality of frames, m, a sequence of matrix operations are performed to obtain the filter harmonics $H_k(\rho)$. Assuming each frame consist of n×n pixels, the matrices $P_{FOM}$, $C_k$ and index matrix ID are computed and stored, the steps for computing the correlation filter H(ρ;φ) is described with reference to the process flow 114.

At 116, a plurality of filter harmonics are computed corresponding to pixel-columns of each of the frames. The filter harmonics for multiple harmonics corresponding to the pixel-columns are computed sequentially, by iterating over the number of pixel-columns. For example, if the harmonics of a frame are denoted by j, then the following algorithm is executed for computing the filter harmonics of each frame:

for j=0 to n−1

(a) Extract $j^{th}$ harmonic of each frame (=$j^{th}$ column) and form a n×m temporary matrix $tmpF_k$ (b) Compute (n×m) matrix TP2[i; k]=$tmpF_k$[i;k] $P_{FOM}$[i; k],element by element division.

(c) Compute (n×m) matrix TP3[i; k]=TP2[i; k]×ID[i; k], element by element multiplication.

(d) Compute complex conjugate transpose $tmpF_k^*$ (e) Compute the product V=$tmpF_k^*$XTP$_3$ (f) Compute inverse of matrix V as $V^{-1}$ (g) Compute TP$_4$=TP$_2$×$V^{-1}$ (h) Extract the $j^{th}$ column of the $C_k$ and compute $j^{th}$ column of filter harmonic $H_k(\rho)$=TP4×$C_{kj}^*$, where * denotes complex conjugate.

end for

At 118, the correlation filter $H_k(\rho;\varphi)$ is computed by taking the inverse Fourier transform of $H_k(\rho)$ and converting it back to cartesian form.

As is seen above, the computation of filter harmonics $H_k(\rho)$ involves frequent matrix-matrix, matrix-vector operations and matrix inversions. Specifically, the computation of filter harmonics includes various matrix operations involving the temporary matrix $tempF_k$. An example of computation of the temporary matrix $tempF_k$ is illustrated in FIG. 1B.

Figure 1B:
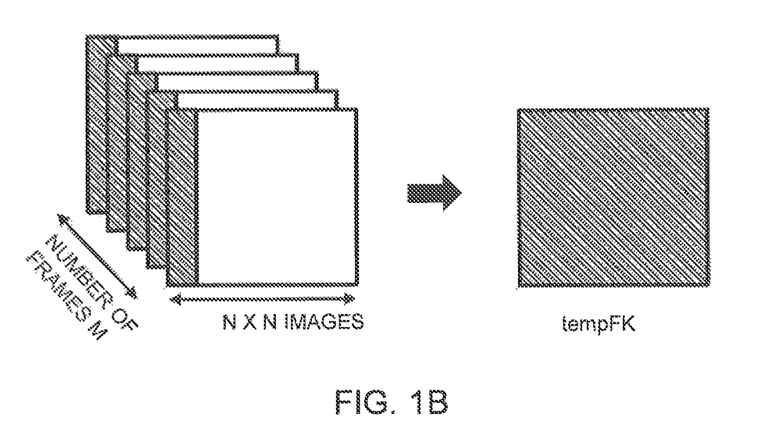

Referring to FIG. 1B, the plurality of frames are associated with a media content. For computation of the temporary matrix $tempF_k$, a slice from each frame can be extracted and stored in the temporary matrix. However, the process of extracting the slice from each of the frames is sequential, and includes extracting a single slice from one frame at a time. For larger, higher resolution and longer duration videos and images, it becomes a cumbersome computational task. For pattern recognition applications in which input is a media content, for example, a video or a set of images, the number of frames and the resolution of the media content could impose huge computational workload.

Various embodiments disclosed herein presents methods and systems for an optimal and parallel implementation of design of the correlation filter that significantly improves the performance of the filter. For example, the embodiments herein disclose a parallel implementation of the OTCHF filter design on multicore processors. Said system can be effectively utilized for pattern recognition applications. In an example embodiment, the disclosed system embodies central processing units (CPU) and graphical processing unit (GPU) to exploit the parallel processing capabilities thereof, in addition to performance optimization techniques and usage of optimal libraries for fast fourier transforms (FFTs) and linear algebra routines, thereby leading to many fold improvement in the performance of the correlation filter. A system for design of the correlation filter is disclosed in FIG. 2.

Figure 2:
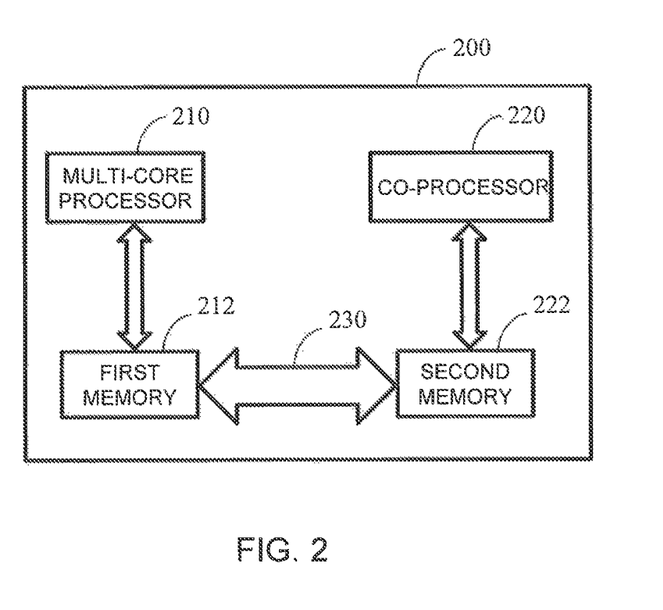
FIG. 2 is a functional block diagram for design of the correlation filter according to some embodiments of the present disclosure.

Referring to FIG. 2, a block diagram of a system 200 for design of the correlation filter is illustrated, in accordance with an embodiment of the present subject matter. The system 200 includes a multi-core processor 210 coupled to a first memory 212, one of more co-processors (such as a co-processor 220) coupled to one or more respective second memories (such as a second memory 222). The first memory 212 and the one or more respective second memories such as the second memory 222 may be coupled by a system bus such as a system bus 230 or a similar mechanism. Example of the system bus 230 may include a peripheral component interconnect (PCI) bus.

The multi-core processor 210 may include circuitry implementing, among others, audio and logic functions associated with the designing of the filter. For example, the multi-core processor 210 may include, but are not limited to, one or more digital signal processors (DSPs), one or more microprocessors, a multi-core processor, one or more special-purpose computer chips, one or more field-programmable gate arrays (FPGAs), one or more application-specific integrated circuits (ASICs), one or more computer(s), various analog to digital converters, digital to analog converters, and/or other support circuits. The multi-core processor 210 thus may also include the functionality to encode messages and/or data or information. The processor 210 may include, among other things, a clock, an arithmetic logic unit (ALU) and logic gates configured to support operation of the multi-core processor 210. Further, the multi-core processor 210 may include functionality to execute one or more software programs, which may be stored in the first memory 212 or otherwise accessible to the multi-core processor 210.

The first memory 212 and the second memory 222, may store any number of pieces of information, and data, used by the system to implement the functions of the system 200. The first memory 212 and second memory 222 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The first memory 212 and the second memory 222 may be configured to store information, data, applications, instructions or the like for enabling the system 200 to carry out various functions in accordance with various example embodiments. Additionally or alternatively, the first memory 212 and the second memory 222 may be configured to store instructions which when executed by the multi-core processor 210 and the co-processor 220, respectively causes the system 200 to behave in a manner as described in various embodiments.

The co-processor 220 may be configured by a graphics driver, stored within a main memory of the system. The graphics driver communicates between applications executed by host multi-core processor 210 and the co-processor 220. In some embodiments, the graphics driver may include a device driver for the co-processor 220.

In an embodiment, the system 200 is caused to receive, via the multi-core processor 210, a media content having a plurality of frames. Examples of media content may include, but are not limited to a video content, a set of images, and so on. In case of media content being a video, the plurality of frames of the video content may be considered as images.

In an embodiment, the system 200 may be caused to partition, via the multi-core processor 210, each frame of the plurality of frames into a plurality of pixel-columns having equal width. In an embodiment, the 'pixel columns' may refer to the columns or slices in each frame of the media content extending through the length of said frame. A pixel-column may be of the width of a single pixel or multiple pixels. An example of the pixel column is depicted and explained further with reference to FIG. 3A.

In an embodiment, the system 200 may be caused to systematically store, via the multi-core processor 210, the plurality of pixel-columns width-wise into a plurality of temporary matrices $tempF_k$. In an embodiment, storing the plurality of pixel-columns into the plurality of temporary matrices is performed in parallel by a plurality of threads of the multi-core processor. In an embodiment, for systematically storing the plurality of pixel-columns width-wise, the multi-core processor 210 may extract single pixel-column from each of the plurality of frames. Further, the multi-core processor 210 may store the single pixel-column extracted from each of the plurality of frames in the temporary matrices $tempF_k$ of the plurality of temporary matrices. An example illustrating the extraction and storing of the plurality of frames in the temporary matrices $tempF_k$ is described further with reference to FIG. 3A.

As is seen previously with reference to FIG. 1B, the plurality of temporary matrices $tempF_k$ is a portion of the data that is to be processed for the purpose of designing the correlation filter. The designing of the correlation filter involves frequent matrix-matrix, matrix-vector operations and matrix inversions operations involving at least the temporary matrices $tempF_k$.

In an embodiment, the system 200 causes distribution of the plurality of temporary matrices $tempF_k$ in sets of batches to each of a plurality of streams associated with the co-processor 220. Herein, streams refer to concurrent compute pipelines which enable better utilization of the co-processors such as GPUs. In an embodiment, the system 200 is caused to transfer, via the multi-core processor, the plurality of temporary matrices to one or more respective second memories (for example, the second memory 222) in the plurality of streams simultaneously in an asynchronous mode. Each stream of the plurality of streams computes a batch of $H_k(\rho)$ columns.

In various embodiments disclosed herein, the system 200 causes computing, via the one or more co-processors 220, a plurality of filter harmonics of the correlation filter. The computing including performing linear algebraic and fast Fourier transform operations (as described with reference to FIGS. 1A-1B) involving at least the plurality of temporary matrices. It will be noted that the GPUs have large number of light weight cores compared to multicore CPUs. Unlike CPU cores, the GPU cores are designed to carry out same instruction at a time but on different data. This enables huge data parallel through-put. On the other hand, CPUs have much more powerful cores, which are capable of carrying out different tasks at the same time at very high speeds. The CPU works as a master and offloads compute intensive work GPU. The data transfer between CPU and GPU happens over PCI bus. An example of computing the plurality of filter harmonics of the correlation filter for designing the correlation filter is described further in detail with reference to FIGS. 5A and 5B.

Although the present subject matter is explained considering the system 200 being implemented as a single device, it may be understood that the system 200 may also be implemented as a variety of computing systems, such as a laptop computer, a desktop computer, a notebook, a workstation, a mainframe computer, a network server, a tablet, a mobile phone, a robot and the like.

Figure 3A:
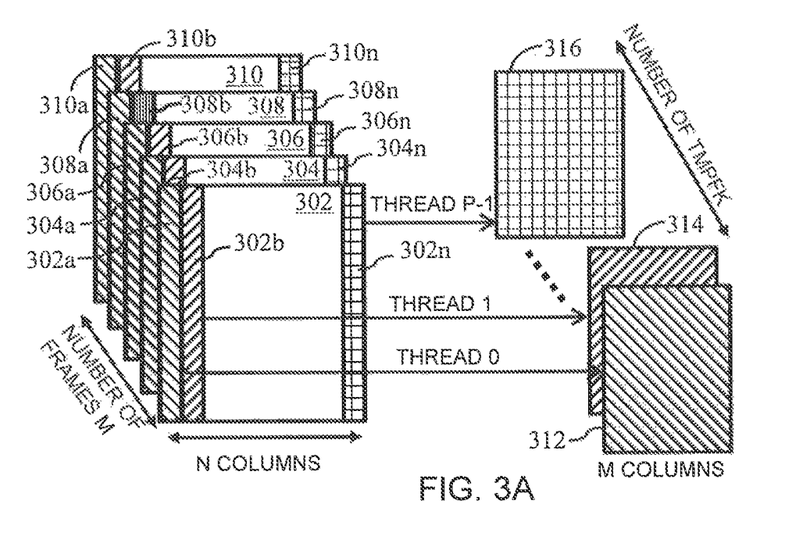
FIG. 3A illustrates generation of temporary matrices for designing of the correlation filter, according to some embodiments of the present disclosure.

FIG. 3A illustrates generation of temporary matrices for designing of the correlation filter, in accordance with an example embodiment. As discussed with reference to FIG. 2, the temporary matrices are generated by extracting a plurality of pixel-columns from the plurality of frames and storing the pixel-columns in temporary matrices. In various embodiments of the present disclosure, the plurality of temporary matrices are generated in parallel.

Referring to FIG. 3A, a plurality of frames including frames 302, 304, 306, 308, 310 are illustrated. The pixel-columns from each of the frames are extracted. For example, the frame 302 includes pixel-columns such as 302a, 302b, . . . 302n. Similarly, the frame 304 includes pixel-columns such as 304a, 304b, . . . 304n. Also, the frame 306 includes pixel-columns such as 306a, 306b, . . . 306n. The frame 308 includes pixel-columns such as 308a, 308b, . . . 308n, and the frame 310 includes pixel-columns such as 310a, 310b, . . . , 310n.

For generating the temporary matrices, corresponding pixel-columns from each of the plurality of frames 302-310 are extracted in parallel by different threads. Herein, corresponding pixel-columns from the plurality of frames 302-310 refers to the pixels-columns at a same relative location with respect to an edge of the respective frame. For example, the pixel-columns 302a, 304a, 306a, 308a, and 310a are the corresponding pixel-columns. Similarly, the pixel-columns 302b, 304b, 306b, 308b, and 310b are the corresponding pixel-columns. Also, the pixel-columns 302n, 304n, 306n, 308n, and 310n are the corresponding pixel-columns. The corresponding pixel columns are illustrated with same shading in FIG. 3A.

In an embodiment, the corresponding pixel-columns are extracted from the respective frames and stored in the $tempF_k$ matrices. For example, the pixel-columns 302a, 304a, 306a, 308a, and 310a are extracted from the frames 302, 304, 306, 308, and 310, and are stored to generate the $tempF_k$ matrix 312. Similarly, the pixel-columns 302b, 304b, 306b, 308b, and 310b are extracted from the frames 302, 304, 306, 308, and 310, and are stored to generate the $tempF_k$ matrix 314. Also, the pixel-columns 302n, 304n, 306n, 308n, and 310n are extracted from the frames 302, 304, 306, 308, and 310, and are stored to generate the $tempF_k$ matrix 316. Herein, it will be noted that the generation of the plurality of $tempF_k$ matrices such as temporary matrices is performed in parallel. For example, $tempF_k$ matrices 312, 314, and 316 are generated in parallel by threads such as thread 0, thread 1, and thread P−1, respectively. In particular, the system is caused to create threads, and each thread extracts m/n columns from each input frame to form m=n $tempF_k$ matrices, where m is the width of input frames. The system is further caused to create n streams corresponding to the number of threads.

The system transfers the tempFk matrices such as $tempF_k$ matrices 312, 314, 316 in a set of batches simultaneously in an asynchronous mode in respective streams. An example of transferring the $tempF_k$ matrices in the set of batches simultaneously is described further with reference to FIG. 3B.

Figure 3B:
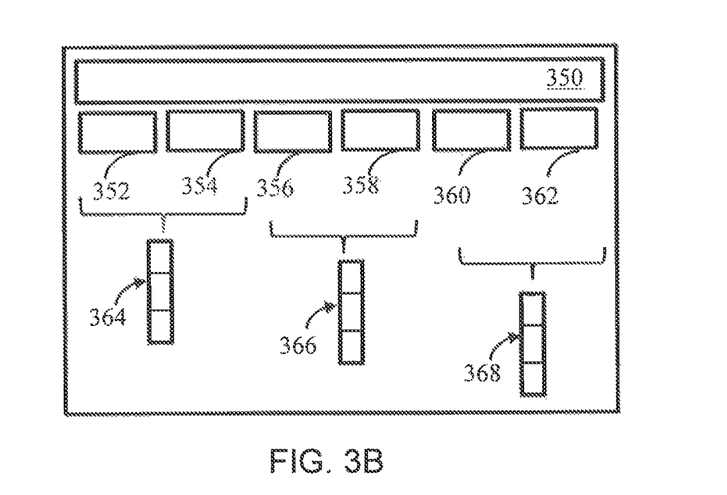
FIG. 3B illustrates a process flow for transferring temporary matrices for batch processing to design a correlation filter, according to some embodiments of the present disclosure.

Referring now to FIG. 3B, the data 350 including the $tempF_k$ matrices, such as matrices 312, 314, 316 is divided into multiple batches and processed in multiple streams. For example, the data 350 is partitioned into the plurality of batches, such as batches 352, 354, 356, 358, 360, 362, and multiple batches may be processed by each stream. For example, a set of batches having batches 352, 354 may be processed by a stream 364, a set of batches having batches 356, 358 may be processed by a stream 366, and a set of batches having batches 360, 362 may be processed by stream 368. All the streams are launched simultaneously which results in overlapped computations and data transfers across streams. Said multi-stream implementation provides boost in the overall performance of the design of correlation filter. A graph illustrating performance improvement due to the disclosed design of the correlation filter is illustrated further with reference to FIG. 6. A flow diagram of a method for design of filter is described with reference to FIG. 4.

Figure 4:
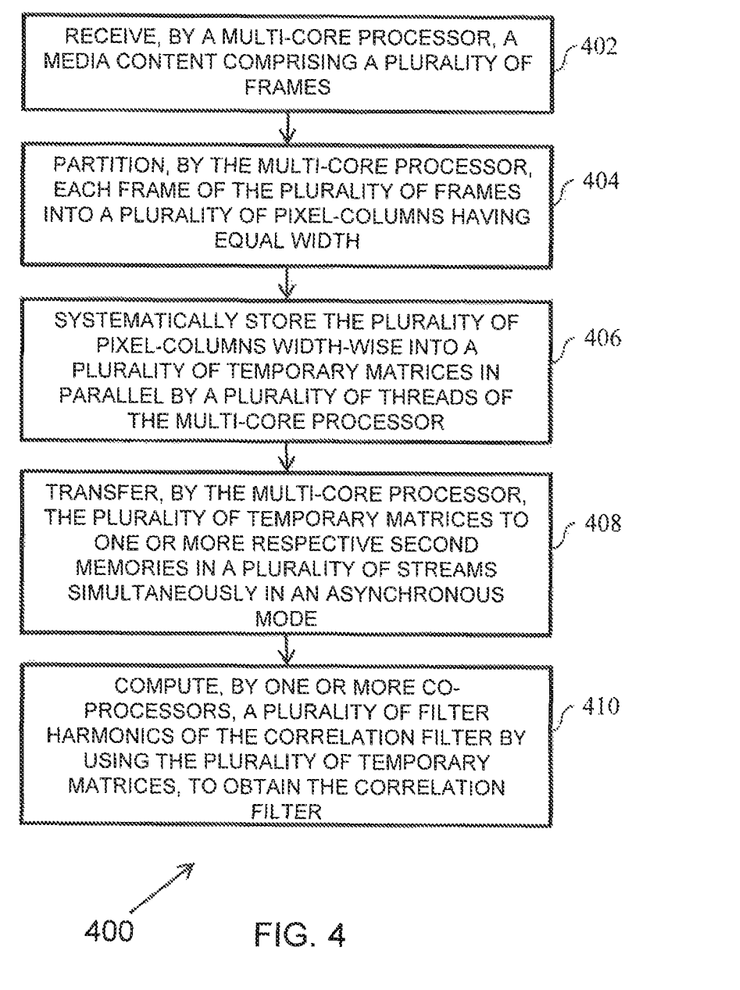
FIG. 4 illustrates a flow diagram of a method for designing of the correlation filter, according to some embodiments of the present disclosure.

FIG. 4 illustrates a flow diagram of a method 400 for design of correlation filter, in accordance with an example embodiment. The method 400 may be described in the general context of computer executable instructions. The method may be embodied on a system for example, the system 200 (FIG. 2). Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 400 may be considered to be implemented in the above described in a multi-processor system 200 (FIG. 2). As described with reference to FIG. 2, the multi-processor system 200 may include a multicore processor (such as the processor 210) coupled to a first memory (such as the first memory 212) and one or more co-processors (such as the co-processors 220) coupled to one or more respective second memories (such as the second memory 222).

At 402, the method 400 includes receiving, by the processor 210, a media content having a plurality of frames. The media content may be a video content, a set of frames or any similar media content. At 404, the method 400 includes partitioning, by the processor, each frame of the plurality of frames into a plurality of pixel-columns having equal width. At 406, the method includes systematically storing the plurality of pixel-columns width-wise into a plurality of temporary matrices. The plurality of pixel-columns are stored into the plurality of temporary matrices in parallel by a plurality of threads of the multi-core processor. An example describing systematically storing the pixel-columns width-wise into the temporary matrices is described already with reference to FIG. 3A.

At 408, the method 400 includes transferring, by the processor 210, the plurality of temporary matrices to one or more respective second memories in a plurality of streams simultaneously in an asynchronous mode. An example explaining transferring the temporary matrices to respective second memories is described with reference to FIG. 3B. At 410, the method 400 includes computing, by the one or more co-processors, a plurality of filter harmonics of the correlation filter. In an embodiment, computing includes performing compute operation, such as linear algebraic and fast Fourier transform operations, involving at least the plurality of temporary matrices, to obtain the correlation filter. An example flow diagram describing the method for design of correlation filter is further described with reference to FIGS. 5A and 5B.

Figure 5A:
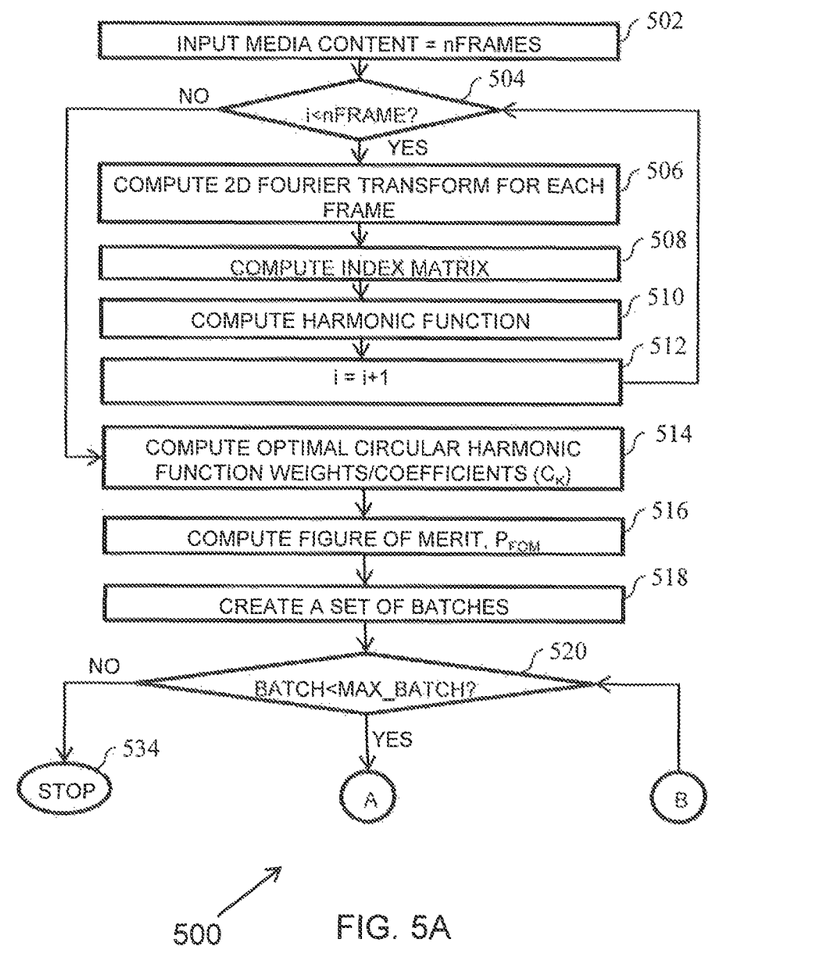
FIGS. 5A and 5B illustrate a flow diagram of a method for designing of the correlation filter, according to some embodiments of the present disclosure.
Figure 5B:
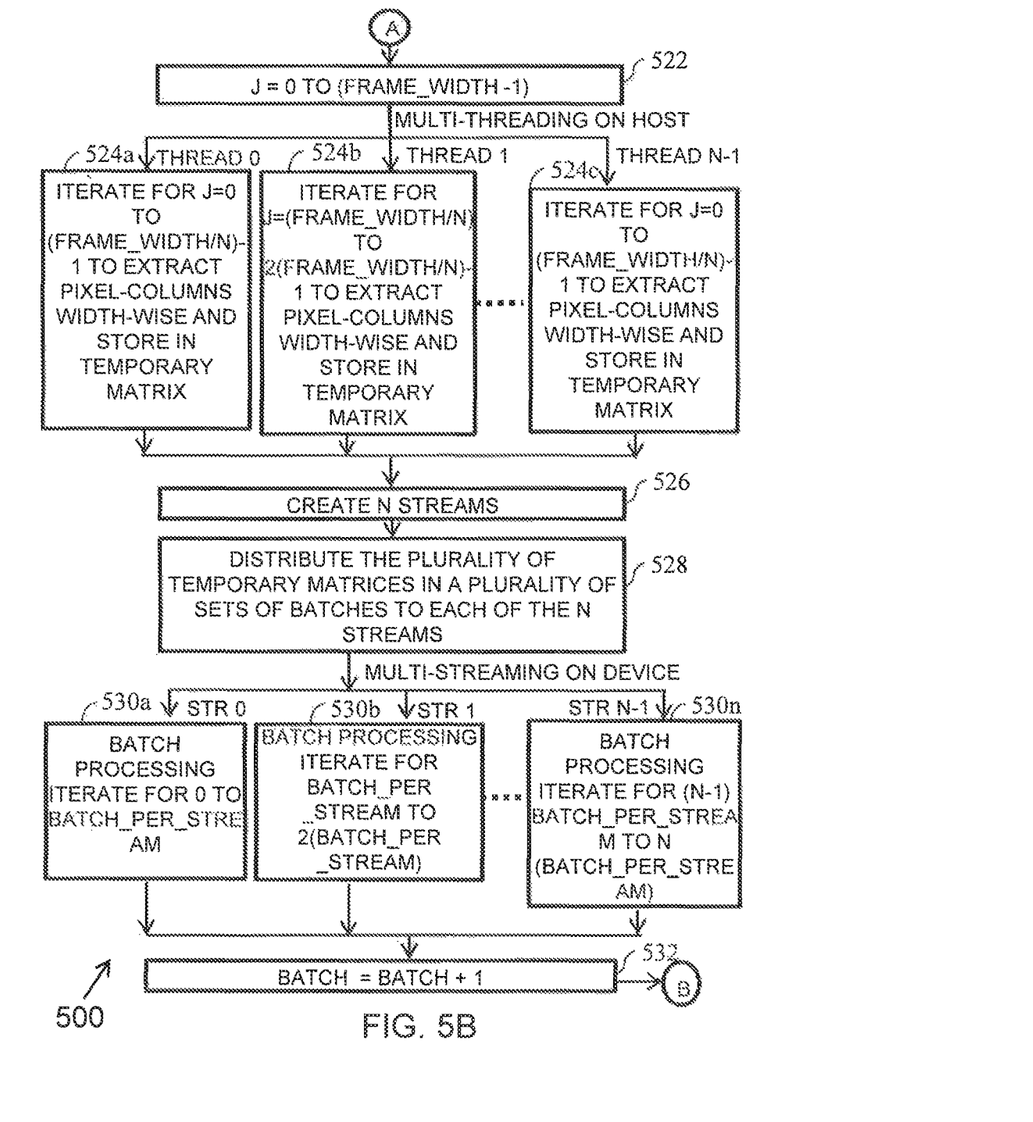

FIGS. 5A and 5B illustrate a flow diagram of a method 500 for detecting memory suspects associated with an application, in accordance with another example embodiment. At 502, a media content having a plurality of frames, for example, n frames is received/input at the system. For each frame of the n frames, the system computes harmonic function iteratively, until the harmonic function for all the frames is computed. For example, an iterative loop is initiated at 504 for determining whether the number of frames is less than the total number of frames (nFRAMES), and if it is determined that the number of frames is less than the total number of frames, then a two-dimensional Fourier transform of each of the plurality of frames is computed to obtain a Fourier transformed image. At block 508, an index matrix which maps the Fourier transformed image to polar coordinates is computed to obtain an index matrix. At block 510, a harmonic function is computed by operating Fourier transform along an axis on index matrix. The process of steps 506-512 is repeated till harmonic function for all the frames (nFRAMES) is obtained. Once the harmonic function for all the frames (nFRAMES) is obtained, at block 514, optimal harmonic circular function weights/confidents ($C_K$) are obtained by computing Fourier transform of the desired correlation function matrix. At 516, a figure of merit, $P_{FOM}$ is computed based on the value of coefficients (CO.

For the plurality of frames, m, a sequence of matrix operations are performed to obtain the filter harmonics $H_k(\rho)$. The filter harmonics $H_k(\rho)$ is to be computed with inputs matrices $P_{FOM}$, $C_k$, index matrix and plurality of frames, $F(\rho)$ etc.

as $H_k(\rho) = \lambda_k \cdot F_k(\rho)/P_{FOM}(\rho)$ where $\lambda_k = C_k / \int_0^\infty |F_k(\rho)|^2 / P_{FOM}(\rho) \rho d\rho$ Assuming that each frame consist of n×n pixels, and the matrices $P_{FOM}$, $C_k$ and index matrix ID are computed and stored, the steps for computing the correlation filter $H(\rho;\varphi)$ is described with reference to the process flow 518-532

Herein, it will be noted that prior to computing the plurality of filter harmonics of the correlation filter the plurality of temporary matrices are distributed in a plurality of sets of batches to a plurality of streams. At 518, a set of batches is created. The system transfers the $tempF_k$ matrices such as $tempF_k$ matrices 312, 314, 316 (FIG. 3A) in the set of batches simultaneously in an asynchronous mode in respective streams. An example of transferring the $tempF_k$ matrices in the set of batches simultaneously is described with reference to FIG. 3B.

In an embodiment, $j^{th}$ harmonic of each image (=$j^h$ column) is extracted and a corresponding n×m temporary matrices $tempF_k$ are formed to obtain a plurality of temporary matrices. For example, at 522, for j=0 to (frame_width-1), multi-threading is performed on the host (the multi-coreprocessor of the CPU). Herein, multi-threading on the host refers to processing of data corresponding to different frames widths in by multiple cores of the multi-core processor of the CPU in parallel. For example, at 524a, loop is iterated for j=0 to [(frame_width/N)-1] to extract pixel-columns width-wise and store in a temporary matrix by a thread, for example, a thread 0. Also, at 524b, loop is iterated for j=(frame_width/N) to 2(frame_width/N)-1, to extract pixel-columns width-wise and store in another temporary matrix by a thread, for example, a thread 1. Similarly, at 524c, loop is iterated for j=(N-1)(frame_width/N) to N(frame_width/N)-1, to extract pixel-columns width-wise and store in yet another temporary matrix by a thread, for example, a thread N, and so on. A data including the plurality of temporary matrices, for example the tempFk matrices, is divided into multiple batches and the plurality of batches are processed in parallel in multiple streams.

At 526, n streams are created for processing the plurality of batches, and the plurality of temporary matrices are distributed in a plurality of sets of batches to each of the n streams at 528. Herein, the distribution of the plurality of temporary matrices in the plurality of sets of batches to each of the n streams may be termed as multi-streaming on device (co-processor or the GPU). Multi-streaming on the device includes distribution of the plurality of temporary matrices (and other data), such that each stream contains multiple GPU threads and computation is performed in multiple threads within each stream. The multi-streaming on the co-processor and further processing of each of the batch may be termed as batch processing. Herein, the batch processing includes performing linear algebraic and fast Fourier transform operations involving the plurality of temporary matrices and other data (such as matrices TP2, TP2, ID, and so on) on each of the plurality of streams in parallel (or concurrently) on the co-processor. Particularly, each stream contains multiple threads and computation (involving the plurality of temporary matrices and other data) is performed by multiple GPU threads in parallel. Each of said computations includes:

Element wise division [TP2]=[$tempF_k$]×[PFom],
Element wise multiplication [TP3]=[TP2]×[ID], Complex conjugate transpose $tempF_k^*$,
Matrix matrix multiplication $[v]=[tempF_k^*]\times[TP3]$,
Matrix Inverse $[v]=[Inv(v)]$,
Matrix matrix multiplication $[TP4]=[TP2]\times[v]$, and
Extracting $j^{th}$ column of $C^k$ and computing $j^{th}$ column of filter harmonic $H^k$ $[H^k]=[TP4]\times[C_k^*]$ The steps for processing of the plurality of $tempF_k$ matrices is termed as batch processing. The batch processing for number of batches per stream is performed in parallel at the GPU. For example at 530a, a loop for batch size 0 to Batch_Per_Stream is iterated by stream 0. Also, at 530b, a loop for Batch_Per_Stream to 2(Batch_Per_Stream) is iterated by stream 1. Similarly, at 530n, a loop for (N−1) Batch_Per_Stream to N(Batch_Per_Stream) is iterated by a stream N−1. Herein all the streams, such as stream 0, stream 1 . . . stream N−1 are launched simultaneously which results in overlapped computations and data transfers across streams. Said multi-stream implementation provides a boost in the overall performance to the system for designing of correlation filter. At 532, the batch size is incremented by 1, and subsequent batches are processed for iterations at block 520 until the batch size becomes equal to the maximum batch size, after which the process ends at 534.

Figure 6:
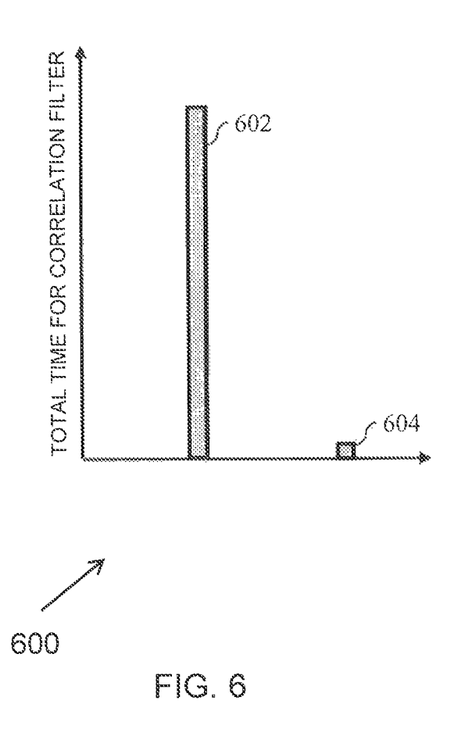
FIG. 6 illustrates performance improvement in designing a correlation filter, according to some embodiments of the present disclosure.

FIG. 6 illustrates performance improvement in designing a correlation filter, in accordance with an example embodiment. As illustrated in FIG. 6, significant improvements have been shown by the disclosed implementation of correlation filter design as compared to the existing systems. An improvement in time is shown with reference to bars 602 and 604 in FIG. 6.

Referring to the chart 600 of FIG. 6, the Y-axis represents a total time of the correlation filter. The bar 602 is representative of the time taken typically for a particular workload (for example, a media content having a particular number of frames) by a processor embodying a single-threaded version. The bar 604 is representative of the time taken for said workload in case the same number of frames are processed to design the correlation filter using the disclosed system (for example, the system 200), in which processing is performed by multi-threading on a device or a GPU. In an example scenario, the processing time taken by using a co-processor (for example, a K20 GPU) is reduced from around 74 (shown by the bar 602 in FIG. 6) seconds to 0.9 secs (shown by the bar 604 in FIG. 6), thereby improving the overall efficiency of the filter design system.

Various embodiment of the present disclosure provides methods and system that enables in accelerating compute operations (including linear algebraic and Fast Fourier transform operations) associated with design of correlation filter. As discussed with reference to FIGS. 1A till 6, due to the multi-threading on host (CPU), the linear algebra and matrix operations can be performed in parallel, thereby completing the computations faster. In an example implementation, cuBLAS which is a highly optimized CUDA C library can be utilized for performing linear algebra and matrix operations.

Another advantage of the disclosed method and system is multi-level parallelism that can be achieved for higher GPU utilization. The problem of designing of correlation filter is broken into a large number of fine data parallel computations. Multiple pixel-columns from each of the frames in are extracted and multiple $tempF_k$ matrices are formed in parallel by using multiple threads with the help of, for example, OpenMP on host or CPU. Similarly multiple $tempF_k$ can be processed in parallel/concurrently on the GPU. Said processing involving multiple $tempF_k$ matrices is termed as batch processing. Also, each step within the batch processing loop is also parallelized. Said two-level parallelism effectively consumes huge compute power of the GPU.

Additionally, the disclosed methods and systems facilitates in minimizing CPU-GPU data transfers. Existing PCI express buses are fast and support good data transfer bandwidth, but they still fall short of compute speed and main memory (i.e. RAM) access speed by huge margins. The algorithm required the $tempF_k$ matrices in batch processing, which in turn require same data transfer to GPU twice. For a high resolution video or large number of training images, this becomes and expensive operation. To avoid this twice data transfer, two copies of $tempF_k$ matrices are maintained in the GPU.

Further, the disclosed methods and system enables multi-Stream computations. The GPUs support multiple stream computation, which allows hiding latencies by overlapping computations with data transfers. To minimize the data transfers between host (CPU) and device (GPU), two copies of $tempF_k$ are maintained. The data is further divided into multiple batches and processed in multiple streams as described in FIG. 3A and FIGS. 5A-5B. The multiple streams are launched simultaneously which results in overlapped computations and data transfers across streams. Said multi-stream implementation provides further boost in the overall system performance.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented method for designing a correlation filter in a multi-processor system having a multi-core processor coupled to a first memory and one or more co-processors coupled to one or more respective second memories, the method comprising:
   receiving, by the multi-core processor, a media content comprising a plurality of frames;
   partitioning, by the multi-core processor, each frame of the plurality of frames into a plurality of pixel-columns having equal width;
   systematically storing the plurality of pixel-columns width-wise in a plurality of temporary matrices, wherein storing the plurality of pixel-columns in the plurality of temporary matrices is performed in parallel by a plurality of threads of the multi-core processor;
   transferring, by the multi-core processor, the plurality of temporary matrices to one or more respective second memories in a plurality of streams simultaneously in an asynchronous mode; and
   computing, by the one or more co-processors, a plurality of filter harmonics of the correlation filter in the plurality of streams, wherein computing in a stream of the plurality of streams comprises performing compute operations involving at least the plurality of temporary matrices, to obtain the correlation filter.

2. The method of claim 1, wherein the media content comprises one of a video and a set of images.

3. The method of claim 1, wherein the multi-core processor comprises a central processing unit (CPU).

4. The method of claim 3, wherein each of the one or more co-processors of the set of second multi-core processors comprises a graphic processing unit (CPU).

5. The method of claim 4, wherein the CPU is coupled to the set of GPUs by a bus.

6. The method of claim 5, wherein the bus is a Peripheral Component Interconnect (PCI) bus.

7. The method of claim 5, wherein systematically storing the plurality of pixel-columns width-wise comprises:
   extracting single pixel-column from each of the plurality of frames; and
   storing the extracted single pixel-column extracted from each of the plurality of frames in a temporary matrix of the plurality of temporary matrices.

8. The method of claim 1, wherein the correlation filter comprises Optimal Trade-Off Circular Harmonic Function (OTCHF) filter.

9. The method of claim 1, wherein prior to computing the plurality of filter harmonics of the correlation filter, the method comprises distributing the plurality of temporary matrices in a plurality of sets of batches to each of the plurality of streams, wherein each stream of the plurality of streams comprises a plurality of compute threads operating in parallel.

10. The method of claim 1, wherein the compute operations comprises linear algebraic and Fast Fourier transform operations.

11. A multi-processor system for designing a correlation filter, the system comprising
   a first memory;
   a multi-core processor coupled to the first memory;
   one or more co-processors coupled to the multi-core processor; and
   one or more respective second memories associated with the one or more co-processors, wherein the multi-core processor is capable of executing programmed instructions stored in the first memory and the one or more co-processors are arranged to execute programmed instructions stored in the one or more respective second memories to:
   receive, by the multi-core processor, a media content comprising a plurality of frames;
   partition, by the multi-core processor, each frame of the plurality of frames into a plurality of pixel-columns having equal width;
   systematically store the plurality of pixel-columns width-wise in a plurality of temporary matrices, wherein storing the plurality of pixel-columns in the plurality of temporary matrices is performed in parallel by a plurality of threads of the multi-core processor;
   transfer, by the multi-core processor, the plurality of temporary matrices to one or more respective second memories in a plurality of streams simultaneously in an asynchronous mode; and
   compute, by the one or more co-processors, a plurality of filter harmonics of the correlation filter in the plurality of streams, wherein computing in a stream of the plurality of streams comprises performing compute operations involving at least the plurality of temporary matrices, to obtain the correlation filter.

12. The system of claim 11, wherein the media content comprises one of a video and a set of images.

13. The system of claim 12, wherein each of the one or more co-processors of the set of second multi-core processors comprises a graphic processing unit (GPU).

14. The system of claim 11, wherein the multi-core processor comprises a central processing unit (CPU).

15. The system of claim 14, wherein the CPU is coupled to the set of GPUs by a PCI bus.

16. The system of claim 11, wherein the correlation filter comprises Optimal Trade-Off Circular Harmonic Function (OTCHF) filter.

17. The system of claim 11, wherein to systematically store the plurality of pixel-columns width-wise, the multi-core processor is configured by the instructions to:
   extract single pixel-column from each of the plurality of frames; and
   store the extracted single pixel-column extracted from each of the plurality of frames in a temporary matrix of the plurality of temporary matrices.

18. The system of claim 11, wherein prior to computing the plurality of filter harmonics of the correlation filter, the multi-core processor is configured by the instructions to distribute the plurality of temporary matrices in a plurality of sets of batches to each of the plurality of streams, wherein each stream of the plurality of streams comprises a plurality of compute threads operating in parallel.

19. The system of claim 11, wherein the compute operations comprises linear algebraic and fast Fourier transform operations.

20. A non-transitory computer-readable medium having embodied thereon a computer program for executing a method for designing a correlation filter in a multi-processor system, the method comprising:
   receiving, by the multi-core processor, a media content comprising a plurality of frames;
   partitioning, by the multi-core processor, each frame of the plurality of frames into a plurality of pixel-columns having equal width;

systematically storing the plurality of pixel-columns width-wise in a plurality of temporary matrices, wherein storing the plurality of pixel-columns in the plurality of temporary matrices is performed in parallel by a plurality of threads of the multi-core processor;

transferring, by the multi-core processor, the plurality of temporary matrices to one or more respective second memories in a plurality of streams simultaneously in an asynchronous mode; and computing, by the one or more co-processors, a plurality of filter harmonics of the correlation filter in the plurality of streams, wherein computing in a stream of the plurality of streams comprises performing compute operations involving at least the plurality of temporary matrices, to obtain the correlation filter.

* * * * *